United States Patent [19]

Gibot

[11] Patent Number: 4,644,754
[45] Date of Patent: Feb. 24, 1987

[54] PROCESS AND APPARATUS FOR COOLING A CHARGE OF PRODUCTS

[75] Inventor: Claude Gibot, Malakoff, France

[73] Assignee: Carboxyque Francaise, Paris, France

[21] Appl. No.: 753,330

[22] Filed: Jul. 9, 1985

[30] Foreign Application Priority Data

Jul. 12, 1984 [FR] France .................. 84 11089
Jan. 11, 1985 [FR] France .................. 84 00361

[51] Int. Cl.[4] ............................................. F25D 25/00
[52] U.S. Cl. ........................................ 62/62; 62/78; 62/384
[58] Field of Search .............. 62/63, 78, 373, 374, 62/375, 380, 384

[56] References Cited

U.S. PATENT DOCUMENTS

| 3,163,022 | 12/1964 | Hottenroth | 62/388 |
| 3,564,866 | 2/1971 | Paine | 62/388 |
| 4,075,869 | 2/1978 | Fitsall | 62/380 |
| 4,276,753 | 7/1981 | Sandberg et al. | 62/380 |
| 4,327,799 | 5/1982 | Scheiwe et al. | 62/62 |

FOREIGN PATENT DOCUMENTS

| 764138 | 8/1971 | Belgium . |
| 0069688 | 1/1983 | European Pat. Off. . |
| 20363 | 4/1913 | United Kingdom . |
| 521715 | 5/1940 | United Kingdom . |

Primary Examiner—Ronald C. Capossela
Attorney, Agent, or Firm—Young & Thompson

[57] ABSTRACT

The apparatus comprises a plurality of modular containers (2) each receiving a charge of products. Liquid $CO_2$ is injected into each container under the control of a thermostat (28). The excess gases are collected in a single manifold (5), heated in a vessel (3) and then discharged through calibrated discharging means (7). The invention is particularly suitable for the cooling of food products.

15 Claims, 5 Drawing Figures

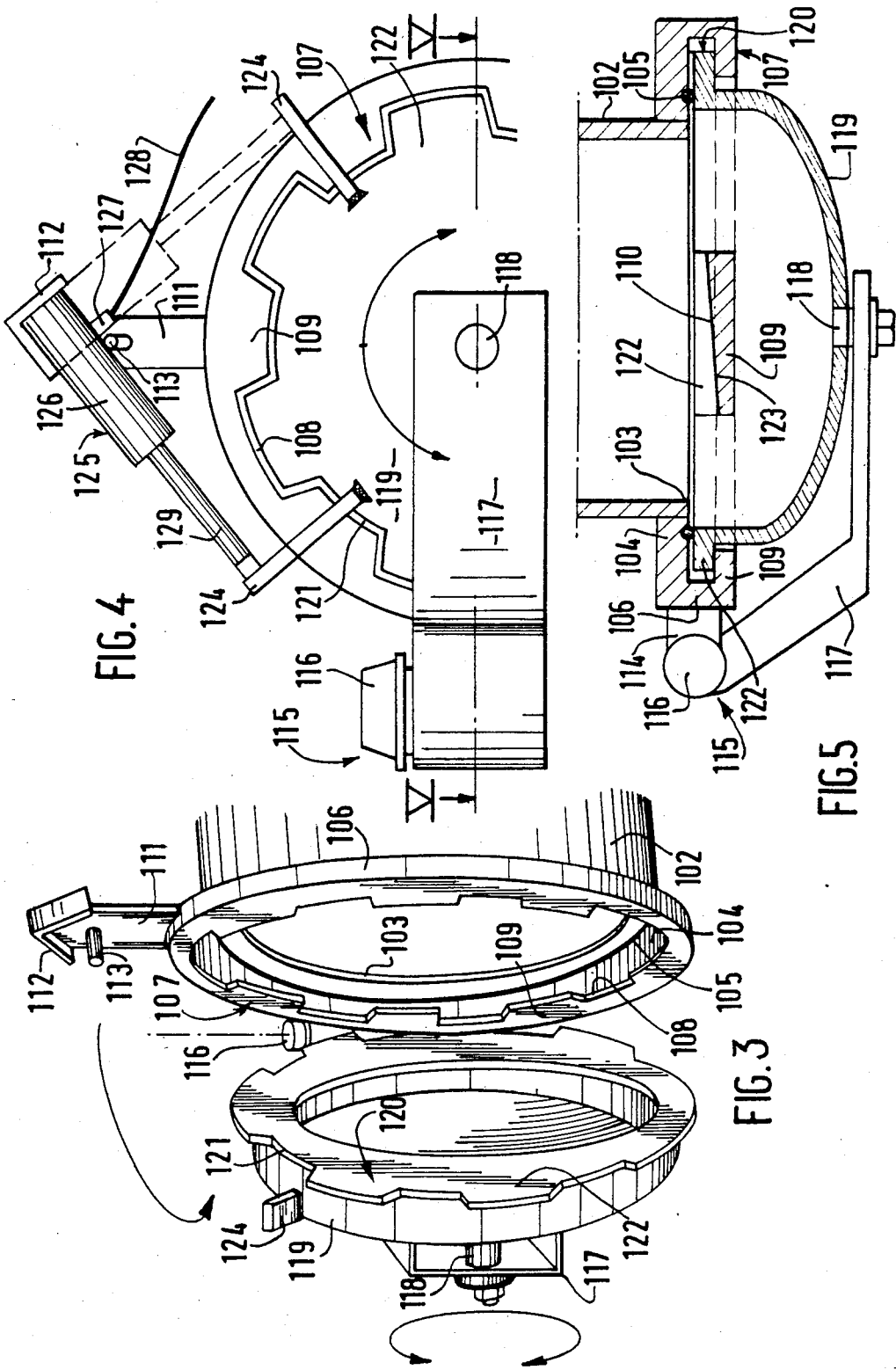

PROCESS AND APPARATUS FOR COOLING A CHARGE OF PRODUCTS

The present invention relates to a process and an apparatus for cooling a charge of products by the introduction of a cold gas, in particular, $CO_2$, in a container containing said charge. It is more particularly applicable to the preservation without freezing of various raw or cooked food products and in particular salt-provisions or delicatessen pastry-work based on pork, poultry, fish, vegetables or the like.

An object of the invention is to provide a cooling technique whereby it is possible to obtain rapidly and cheaply on an industrial scale products capable of being preserved without freezing for relatively long periods.

For this purpose, the invention provides a process for cooling a charge of products, and in particular food products, by the introduction of a cold gas, in particular $CO_2$, in a container containing said charge, wherein the cooling is effected under a pressure higher than atmospheric pressure, the gas issuing from the container is heated to a temperature higher than 0° C., and the heated gas is discharged through a calibrated discharge means.

The products treated in this way are simultaneously cooled and saturated with $CO_2$. When they are thereafter packed in dishshaped receptacles under a film of thermowelded plastics material, under an atmosphere of $CO_2$ the losses of $CO_2$ due to the permeability of the films of plastics material are simultaneously replaced by the $CO_2$ resulting from the desorption of the products. Consequently, the period of preservation of the products is considerably lengthened, and their presentation in dish-shaped receptacles is much more satisfactory than that of products preserved under a vacuum.

Further, the heating of the gases before they are discharged enables the active parts of the calibrated discharging means to be protected while these discharging means retain all their precision in the regulation.

In order to treat or process a plurality of charges which are identical or not simultaneously, it it advantageous to treat each charge in a container, to collect and heat all of the gases issuing from the containers, and to discharge all of the heated gases through a single conduit. In this way it is possible to both solve certain technological difficulties and achieve high operating flexibility, as will be clear hereinafter.

Another object of the invention is to provide an apparatus for carrying out a process such as that defined hereinbefore. This apparatus comprises:
a container adapted to withstand an overpressure;
means for introducing a cold gas under pressure in said container;
means for regulating the temperature prevailing in the container;
a conduit for discharging gas from the container equipped with means for heating the discharged gas and, downstream of these means, a calibrated discharging means.

In an advantageous embodiment of this apparatus, the container is provided with a rapidly opened door. This door may be in particular pivotally mounted on a pin carried by a hinge which pivotally mounts the door on the container, the latter and the door having locking projections of the bayonet type having a camming effect.

An example of the carrying out of the invention will now be described with reference to the accompanying drawings in which:

FIG. 3 is a partial perspective view of a container of a modification of the cooling apparatus according to the invention;

FIG. 4 is a front elevational view of this container, the door having been unlocked, and FIG. 5 is a sectional view taken on line V—V of FIG. 4, with the door locked.

Figure 1:
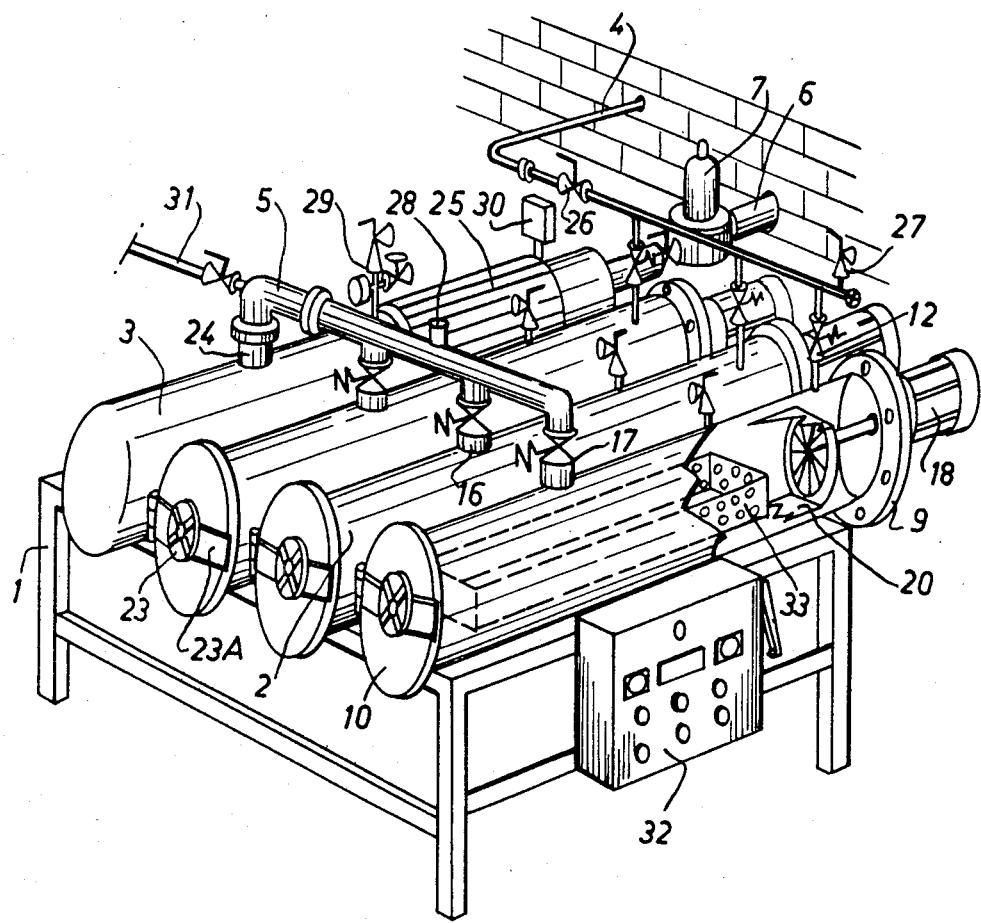
FIG. 1 is a perspective view, with a part cut away, of an apparatus according to the invention.

The apparatus shown in FIG. 1 is adapted to cool under pressure to a temperature on the order of +2° C., and therefore without freezing food products such as salt-provisions or delicatessen pastry-work based on pork, poultry, fish, vegetables or other products. This apparatus is carried by a frame 1 and comprises three sealed containers 2 for cooling under pressure, all these containers being identical, a heating vessel 3, a conduit 4 supplying liquid $CO_2$, a gas manifold 5, and a discharge pipe 6 provided with a calibrated discharging means or emptying means 7.

Figure 2:
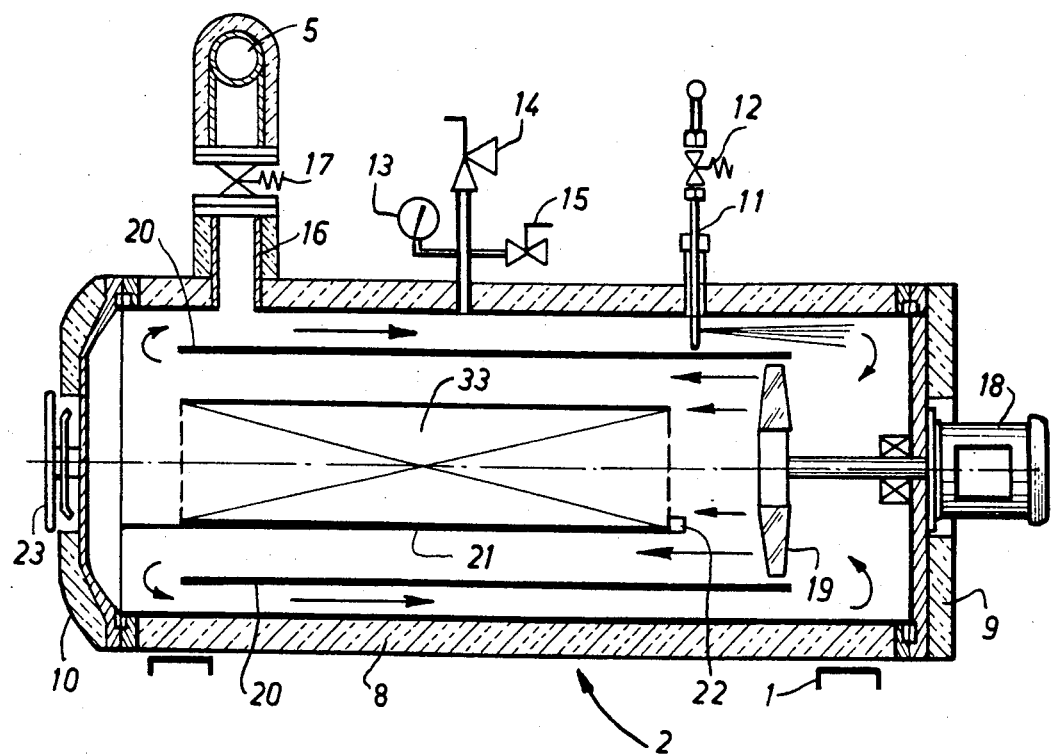
FIG. 2 is a longitudinal sectional view of a cooling container of this apparatus.

As can be seen in FIG. 2, each container 2 comprises a cylindrical barrel 8 having a horizontal axis and provided with a detachable end wall 9 at one end and a door 10 at the other end.

Extending through the barrel 8 is a branch conduit 11 from the conduit 4 provided with an electrovalve 12 and terminating in an expansion nozzle. Projecting from the barrel 8 is a pressure take-off leading to a pressure gauge 13, to a safety valve 14 and to a purge cock 15, and a pipe 16 which is connected to the manifold 5 through an electrovalve 17.

An electric motor 18 is secured externally to the end wall 9 and its shaft extends into the container 2 and terminates in a blower fan 19. Provided above and below the latter are two horizontal deflector plates 20 which are laterally connected to the barrel 8 and extend longitudinally to a short distance from the end wall 9 and the door 10.

The barrel 8 is also provided internally, a little above the lower plate 20, with two longitudinal slideways 21 terminating in two abutments 22 close the fan 19.

The door 10 which is pivotally mounted on one side of the barrel 8, comprises a rapidly opening and closing handle 23 of the quarter-turn type connected to a locking latch 23A. By way of a modification, the door 10 could be provided with a plurality of manual locks arranged around its periphery.

The heating vessel 3 has the same cylindrical shape with a horizontal axis as the containers 2, these four containers being mounted side-by-side on the frame 1. The vessel 3 has an inlet pipe 24 connected to the outlet of the manifold 5, a heating sleeve 25 having electric resistance heating means, and a discharge pipe 6.

The latter leads from the rear end of the vessel 3 adjacent to the end walls 9. The discharging means 7 is an upstream pressure regulator of the type having a diaphragm biased by a calibrated spring, for example calibrated at 3 bars; regulating means of this type is capable of providing a precise regulation, for example between 3 and 3.2 bars, of the pressure prevailing on the upstream side, i.e. in the vessel 3 and in the containers 2.

Also shown in FIG. 1 are various accessories of the apparatus: a stop cock 26 and a safety valve 27 in the conduit 4; a temperature detector 28 and a unit 29 comprising a pressure gauge—safety valve—purge valve in the manifold 5; a thermostat 30 on the vessel 3; a conduit 31 for creating a vacuum connected to the manifold 5 and provided with a stop cock; and an electric control box 32. Furthermore, the containers 2, the conduit 4 and the manifold 5 are suitably heat insulated.

The apparatus just described operates in the following manner:

With the electrovalves 17 open, the sleeve 25 is rendered operative and, under the control of the thermostat 30, brings and then maintains the temperature of the vessel 3 at a relatively high set value, for example, $+30°$ C. The cooling operations may now be commenced.

For this purpose, the products to be treated or processed are placed in three parallel-sided baskets 33 and the containers 2 are charged with the products, each basket being supported and guided by the slideways 21 and being pushed into the containers up to the abutments 22.

After closing and locking the doors 10, the motors 18 are started up and the valves 12 are opened, if desired in an intermittent manner; liquid $CO_2$ coming from a storage of this liquid under 20 bars, is injected into the containers 2 through the discharge nozzles of the pipes 11 toward the end walls 9, as shown in FIG. 2. The fan 19 ensures in each container a forced circulation of the cold gaseous $CO_2$ thus produced in the direction of the arrows.

The cold gases escape throught the manifold 5 and become diluted in the hot atmosphere of the vessel 3. The heating power of the sleeve 25 is such that, for a maximum flow of cold gas which may issue from the three containers 2, the temperature of the vessel 3 remains positive, for example higher or equal to $+5°$ C.

The pressure gradually rises in the apparatus until it reaches the set value of 3 bars. The discharging means 7 then opens and starts to regulate at this value the pressure in the vessel 3, the manifold 5 and the containers 2. At the same time, the temperature of the cooling containers is regulated by the temperature detector 28 at a predetermined value, for example $-20°$ C., this detector controlling the valves 12 injecting liquid $CO_2$.

At the end of a predetermined period of treatment corresponding to a temperature of treated products on the order of $+2°$ C., the motors 18 and the injection of $CO_2$ are stoped, the containers are returned to atmospheric pressure by the opening of the purge valves 15, the doors 10 are opened, and the baskets 33 are extracted from the containers and conveyed to a station for packing the products in dish-shaped receptacles under $CO_2$ at atmospheric pressure and a film of thermowelded plastics material.

It will be understood that all of the operations, apart from the introduction and discharge of the baskets 33, may be automatically controlled by a program adapted to each type of product to be treated.

If several types of products are treated, the containers may be without difficulty controlled independently of each other merely by isolating the non-charged container or containers by means of the corresponding electrovalves 17. In this case, these electrovalves 17 are once again opened only when the equilibrium of the pressure is re-established. Thus it can be seen that the apparatus has great flexibility of utilization owing to its modular design.

On the other hand, if a single type of product is treated or processed, the modular structure remains advantageous, on one hand, because it permits an adaptation to the amounts to be treated by temporarily putting out of action one or two containers, on the other hand, because it permits an economical construction of the rapidly-opened doors 10 resisting the pressure, which would not be possible with a single container of large diameter.

Owing to the fact that the apparatus operates under pressure, the products are simultaneously cooled to the desired temperature and saturated with $CO_2$. More precisely, the pressure is so chosen that the saturation time is substantially equal to the cooling time. There are thus rapidly and cheaply obtained products capable of being preserved a long time without freezing, as explained hereinbefore.

The apparatus may also be used for treating or processing alveolate products, for example delicatessen pastry coated with a crust of cooked pastry. In this case the procedure is the following:

charging the three containers 2;

creation of a partial vacuum (for example $-0.5$ bar) within the whole of the apparatus by means of the conduit 31, which results in a degassing of the products to be treated;

heating of the vessels 3 and, simultaneously starting up of the motors 18 and injecting $CO_2$ regulated by the temperature detector 28;

end of the treatment, as before.

There is represented in FIGS. 3 to 5 the front end of a container 102 of a modification of the apparatus of cooling under pressure described hereinbefore. This end opens onto the exterior through a circular opening 103 on the periphery of which an annular flange 104 is welded. A circular groove is provided in the flange 104 which provides a cavity for a sealing O-ring 105.

The flange 104 carries an outer cylindrical edge 106 provided at its free end with a radial inwardly extending flange 107. The latter defines on its inner periphery a series of notches 108 and projections 109 whose surface facing the interior of the container defines an oblique ramp 110 (FIG. 5).

Projecting from the top of the edge 106 is a vertical member 111 which carries on its front side, on one hand, an L-shaped end member 112, each wing of which is downwardly inclined at 45°, and on the other hand, a pin 113 located under the angle of this L-shaped member and slightly upwardly inclined.

The edge 106 also carries on its horizontal diameter, a wing 114 of a hinge 115 having a vertical pivot pin 116. The other wing 117 of this hinge carries at its end a horizontal journal 118 on which the door 119 of the container is freely rotatively mounted.

The door 119 has an outwardly curved dished-shape and terminates in a radial flange 120. The latter defines on its outer periphery a series of notches 121 and projections 122. As viewed in front elevation (FIG. 4), the notches 121 are, apart from clearance, in corresponding relation to the projections 109 of the container, while the projections 122 are, apart from clearance, in corresponding relation to the notches 108 of the container. Moreover (FIG. 5) the side of the projections 122 opposed to the container 102 forms an oblique ramp 123 having the same inclination as the inner side of the projections 109.

Two radial abutments 124 are welded to the periphery of the main part of the door 119. They radially extend beyond the edge 106 of the container. Each abutment is formed by a planar plate contained in a plane containing the axis of the journal 118, each plane being upwardly inclined at 45°.

The apparatus further comprises a detachable jack 125 (not shown in FIG. 3) whose cylindrical body 126 is provided with a lateral connector 127 connected to a pipe 128 supplying actuating fluid. The dimensions of the body 126 are such that the jack can be placed in position on the member 111 in either of two positions perpendicular to each other. In the first position, shown in full line in FIG. 4, the axis of the jack encounters the end part of the member 124 corresponding to the unlocking of the door; in the second position shown in dot-dash line in FIG. 4, the axis encounters the other end part of the other member 124. In each position, the end of the body 126 is lodged in the L-shaped member 112 and bears against the pin 113, and the jack is retained in position, on one hand, by the slight upward inclination of this pin, and, on the other hand, by the bearing of the connector 127 against the latter.

When a charge of product to be cooled is placed within the container 102, the hinge 115 is closed by causing the projections 122 to penetrate the notches 108. The jack 125 is disposed in the aforementioned second position with the piston rod retracted. Then the jack is extended, its piston rod 129 engages the corresponding abutment 124 and turns the door around the journal 118. In this way, the ramps 123 become applied against the fixed ramps 110 and the resulting camming effect urges the flange 122 of the door against the flange 104 by crushing the sealing element 105 (FIG. 5). The door is then locked and the closure of the container is capable of withstanding the internal overpressure of this enclosure.

When the cooling operation under pressure has finished, the jack is retracted and brought to its aforementioned first position and made to extend. Its piston rod 129 engages the other abutment 124 and turns the door in the unlocking direction until its projections 122 are placed in confronting relation to the notches 108. It is then possible to open the door by swinging it around the pivot pin 116 of the hinge (FIG. 3) and withdraw the treated charge of product.

It will be observed that, owing to the great leverage between the end of the abutments 124 and the axis of the journal 118, these operations can be effected with a jack which develops a relatively moderate force.

The jack may be actuated manually and the jack may be a single-acting or double-acting jack. It is also possible to envisage the use of a jack articulated between two positions on the member 111 and controlled automatically.

By way of a modification, there may be permanently disposed on the member 111 (or on any other suitable fixed support) two jacks which are roughly perpendicular to each other and adapted to act, each one, on one of the two abutments 124 (or on one or two similar abutments disposed in another place of the periphery of the door). In this case also, the door opening and closing operations may be controlled manually or automatically.

What is claimed is:

1. Process for cooling a charge of products, and in particular food products, comprising the steps of: introducing a cryogenic gas under pressure, particularly $CO_2$, into container means sealed to the ambient atmosphere, said container means containing said charge; cooling said charge in said container means by means of said gas at a predetermined pressure higher than atmospheric pressure; withdrawing excess gas from said container means into a heating means in communication with said container means; heating said withdrawn gas in said heating means at superatmospheric pressure to a temperature higher than 0° C.; and discharging the heated gas from said heating means through a calibrated, pressure-regulating discharging means.

2. Process according to claim 1, wherein said container means comprises a plurality of containers in side-by-side arrangement, each said container being adapted to accept a said charge, and wherein said excess gas is withdrawn from all said plurality of containers and passed to said heating means, and is discharged from said heating means through a single conduit.

3. Process according to claim 1, and generating a partial vacuum in said container means prior to said cooling step.

4. Apparatus for cooling a charge of products, in particular food products, by introduction of a cryogenic gas, in particular $CO_2$, said apparatus comprising:
   container means sealable to the ambient atmosphere and adapted to withstand an overpressure;
   means for introducing a cryogenic gas under pressure into said container means;
   means for regulating the temperature in said container means;
   means for withdrawing excess gas from said container means;
   means for heating said withdrawn gas to a temperature greater than 0° C., said heating means being in communication with said container means and said withdrawing means;
   and calibrated, pressure-regulating gas discharge means disposed downstream of said heating means.

5. Apparatus according to claim 4, wherein said means for introducing cryogenic gas operates responsive to said temperature regulating means.

6. Apparatus according to claim 4, wherein said container means comprises at least one quick-opening hatch.

7. Apparatus according to claim 4, wherein said gas withdrawing means comprises a gas discharge conduit connecting said container means to said heating means, and said temperature regulating means is adapted to measure the prevailing temperature in said gas discharge conduit.

8. Apparatus according to claim 4, wherein said container means comprises a plurality of similar containers, all said plurality of containers being connected to said gas withdrawing means.

9. Apparatus for cooling a charge of products, particularly food products, by introduction of a cryogenic gas, particularly $CO_2$, said apparatus comprising:
   container means adapted to withstand an overpressure, said container means comprising a quick-opening hatch, said hatch comprising a pin and hinge assembly pivotally mounting said hatch on said container means, said container means and said hatch comprising mutually interengaging, locking projections of the bayonet type having a camming effect;
   means for introducing a cryogenic gas under pressure into said container means;
   means for regulating the temperature in said container means;
   heating means disposed downstream of said container means for heating excess gas withdrawn from said container means to a temperature greater than 0° C.;

a conduit connecting said container means to said heating means;

and a calibrated, pressure-regulating discharge means disposed downstream of said heating means.

10. Apparatus according to claim 9, wherein said hatch comprises at least one actuating projection provided on its periphery.

11. Apparatus according to claim 10, wherein said at least one projection is two projections, for exerting a torque in each of two directions on the door, respectively.

12. Apparatus according to claim 11, wherein said at least one jack is two jacks adapted to exert a torque in each of two directions on said hatch, respectively.

13. Apparatus according to claim 10, wherein said container means comprises a support, and at least one jack mounted on said support, said at least one jack being so disposed as to act tangentially of the door on said at least one projection provided on said peripheral portion of the hatch.

14. Apparatus according to claim 13, and means for selectively positioning said at least one jack in one of two positions corresponding to a locking and unlocking of said hatch, respectively.

15. Apparatus for cooling a charge of products, and in particular food products, comprising:

container means sealed to the ambient atmosphere and adapted to withstand an overpressure;

means for introducing a cryogenic gas, particularly $CO_2$, into said container means;

heating means disposed downstream of said container means for heating excess cryogenic gas withdrawn from said container means to a temperature higher than 0° C.;

and means for discharging said heated gas through a calibrated, pressure-regulating discharging means.

* * * * *